United States Patent

[11] 3,633,481

| [72] | Inventor | Klaus Kuhl<br>Immenhausen, Germany |
|---|---|---|
| [21] | Appl. No. | 851,980 |
| [22] | Filed | Aug. 21, 1969 |
| [45] | Patented | Jan. 11, 1972 |
| [73] | Assignee | Hertel & Reuss<br>Kassel, Germany |

[54] PHOTOMICROSCOPE
9 Claims, 3 Drawing Figs.

[52] U.S. Cl. .................................................. 95/42, 95/12
[51] Int. Cl. ................................................ G03b 19/12
[50] Field of Search .......................................... 95/12, 42

[56] References Cited
UNITED STATES PATENTS

| 2,330,613 | 9/1943 | Nuchterlein | 95/42 UX |
| 3,100,430 | 8/1963 | Morelle | 95/42 |
| 3,106,129 | 10/1963 | Frenk et al. | 95/12 |
| 3,327,600 | 6/1967 | Trankner | 95/42 |
| 3,417,685 | 12/1968 | Kato et al. | 95/12 |
| 3,451,324 | 6/1969 | Miyaucht | 95/42 |

Primary Examiner—Samuel S. Matthews
Assistant Examiner—Michael Harris
Attorney—Hane & Baxley ABSTRACT: The photomicroscope comprises a photographic camera and a microscope disposed in optically coacting relationship. An ocular permits viewing of objects placed on a stage of the microscope and is disposed outside of the light beam from the microscope to the camera. A beam splitter interposed in this light beam directs part of the light beam to the camera and deflects another part toward an exposure meter. A fully silvered mirror can be selectively interposed into the path of the light beam from the beam splitter toward the ocular or withdrawn from this path. The mirror, when in its position interposed into the path of the light beam, directs the light beam upon the light meter for the purpose of indicating the available intensity of the light.

PHOTOMICROSCOPE

The invention relates to a photomicroscope and more particularly to a photomicroscope in which beam splitter means interposed in the light beam from the microscope to the camera directs part of the light beam to the ocular of the photomicroscope.

BACKGROUND

Photomicroscopes require an exposure meter usually an exposure meter including a photo sensitive resistor the current output of which controls the intensity of the light used by the photomicroscope. To enable the photosensitive resistor to sense and measure the intensity of the light it is customary to divide the light beam incident from the microscope upon the camera.

Photomicroscopes of the general kind herein referred to as heretofore known, require for this purpose two beam splitters disposed in optically serial relationship. One beam splitter directs part of the light beam to the ocular of the microscope and the other beam splitter directs part of the light beam to a light sensitive means measuring or controlling the illumination at the microscope usually to a photo sensitive resistor as previously explained.

Photomicroscopes of this type have several disadvantages. The provision of two serially disposed beam splitters entails a considerable optical length of the microscope to accommodate the required optical components. Moreover, only a comparatively small part of the total available light is available for the part of the light beam directed to the ocular and to the means controlling or measuring the illumination at the microscope as by far the largest part of the light must be directed to the photographic camera.

In order to compensate for such losses of light especially at it affects the light required for the photosensitive resistor or another photosensitive circuit component suitable for the purpose, microscopes as now know include a photomultiplexer. Such multiplexer requires very considerable and hence expensive electronic circuitry.

It is also known to replace the beam splitter which directs part of the light beam to the ocular by a fully silvered mirror or by a suitable prism. Depending upon whether an object is to be photographed or only to be viewed, the mirror or the prism is inserted into the path of the light beam or withdrawn therefrom. To effect such movements of the mirror or the prism, a suitable and rather complex mechanism is required and such mechanism must be so designed that it does not affect the optical adjustment of the photomicroscope.

Another disadvantage of photomicroscopes using two serially arranged beam splitters is that there are four glass-air surfaces and such surfaces unavoidably cause dispersion and stray light which adversely affect the quality of the obtained photographs.

It is a broad object of the invention to provide a novel and improved photomicroscope of the general kind above referred to which is free of all the above pointed out disadvantages.

A more specific object of the invention is to provide a novel and improved photomicroscope which requires only one beam splitter by means of which part of the light beam from the microscope to the camera can be utilized for controlling the intensity of the light source or measuring the required exposure time.

The aforepointed out objects, features and advantages and other objects, features and advantages which will be pointed out hereinafter, are broadly obtained by deflecting part of the light beam directed to the ocular of the microscope to a light-sensitive means for controlling or measuring the light intensity.

According to one aspect of the invention, part of the light beam directed to the ocular is indirectly or directly reflected to the light-sensitive means by means of an adjustable mirror interposed in the light beam.

The mirror may be normal to the part of the light beam in which case the means controlling or measuring the light, for instance, a photosensitive resistor is disposed on the side of the beam splitter opposite to the side on which the mirror is disposed. The light beam reflected by the mirror then reaches the means controlling or measuring the light through the beam splitter.

According to another aspect of the invention, the mirror is disposed at an angle to the path of the light beam preferably at a 45° angle so that the light beam is reflected by the mirror at a right angle with reference to the means controlling or measuring the light, usually a photosensitive resistor.

The mirror interposed in the light beam path directed to the ocular is preferably mounted as a drop mirror in a manner such that the normal operational position of the mirror intersects the light path of the beam. The mirror is lifted out of this intersecting position, for instance, by means of a suitable linkage only when an observer wants to use the ocular. After completion of the observation of the object, the linkage used for lifting the mirror is released whereupon the mirror will drop back into its normal or intersecting position.

The invention further contemplates that the means for controlling or measuring the light is directly interposed in the part of the light beam directed to the ocular and is so arranged that it will normally occupy a position intersecting the light beam. It is lifted out of this position, for instance by means of a suitable linkage, only while and when an observer wants to use the ocular.

The mirror or the means for controlling or measuring the light is so arranged in the path of the light beam that it will cover the ocular in its normal or intersecting position. This has the advantage that stray light or ambient light cannot reach the photosensitive resistance through the ocular thereby avoiding a falsification of the light intensity of the beam part directed upon the photosensitive resistor.

The photomicroscope according to the invention has the advantage that sufficiently bright light is available both for viewing an object and for the means controlling or measuring the light.

The costs of a photomicroscope according to the invention are much lower than those of a comparable photomicroscope of conventional design. Moreover, due to the use of a single beam splitter there are only two glass-air surfaces so that the amount of dispersion or stray light reaching the emulsion layer in the camera is correspondingly reduced thereby improving the contrast clarity and definition of the obtained photographs.

In the accompanying drawing several preferred embodiments of the invention are shown by way of illustration and not by way of limitation.

Figure 1:
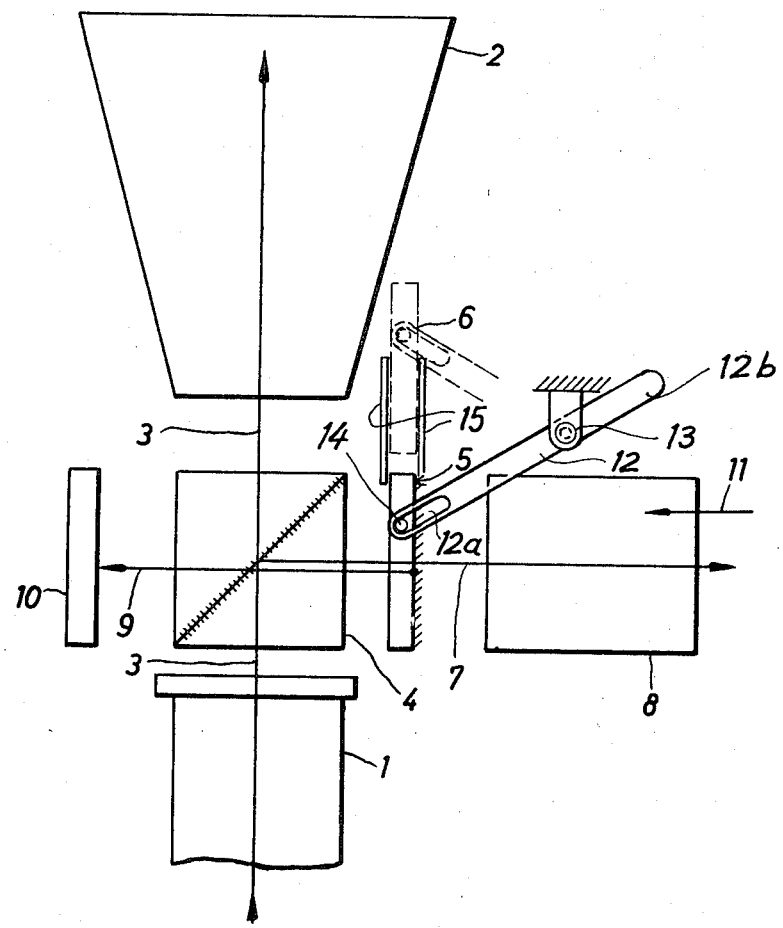
FIG. 1 is an elevational diagrammatic view of an exemplification of a photomicroscope according to the invention.

Referring first to FIG. 1 more in detail, a light beam 3 is directed by a microscope 1 of conventional design upon a camera 2 also of conventional design. A beam splitter 4 is interposed in the light path. This beam splitter may consist of a partially or thinly silvered plate of glass disposed at a suitable angle such as about 45° angle. It may also be, as shown, in the form of a two-part cubic prism which is partly silvered at a diagonal surface. Beam splitters of the general kind above referred to are generally known in the art and any other suitable type of beam splitter may be used for the purpose of this invention.

The beam splitter deflects a part of the light beam upon an ocular 8 of the microscope. As shown, the ocular is disposed outside of the light path between the microscope and the camera.

According to the invention, a fully silvered mirror 5 is interposed in light beam 7. This mirror is positioned normal to the light beam and reflects a beam 9 to an optical light sensitive means 10 for controlling or measuring the illumination used in the photomicroscope. The means may comprise a conventional light meter including photosensitive resistor. Light meters of this kind are well known and details thereof do not constitute part of the invention. As shown in the figure, the beam 9 reflected by mirror 5 passes through the beam splitter, that is, means 10 is disposed optically posterior of the beam splitter as seen from mirror 5.

The mirror is movably disposed so that it can be moved into and out of its position intersecting light beam 7. There is diagrammatically indicated a two-arm lever 12 pivotal about a pin 13 and hinged to mirror 5 by means of a pin 14 engaged with an elongate slot 12a in lever 12. A downward pressure upon lever arm 12b will lift mirror 5 into the dotted position 6 in which it is steadied by guides 15. Release of lever arm 12b will cause the mirror to return by gravity from its position withdrawn from intersection with beam 7 into the position shown in full lines, said position constituting the operational or normal position of the mirror. A spring may be provided to assist drop of the mirror into its lower position. Other suitable mechanisms for moving the mirror into and out of intersection with beam 7 can be readily visualized.

As is evident, the optical means 10 is controlled by the intensity of the light of beam 9 impinging upon it and will accordingly, control the illumination available for the photomicroscope or measure the light intensity for manual adjustment of the illumination.

The mirror is so disposed that it occludes the exit face of ocular 8 in its position intersecting beam 7 so that ambient light entering the ocular as is indicated by an arrow 11 cannot reach means 10 through beam splitter 4 thereby eliminating falsifications of the control functions or indications of means 10 by the ambient light.

Figure 2:
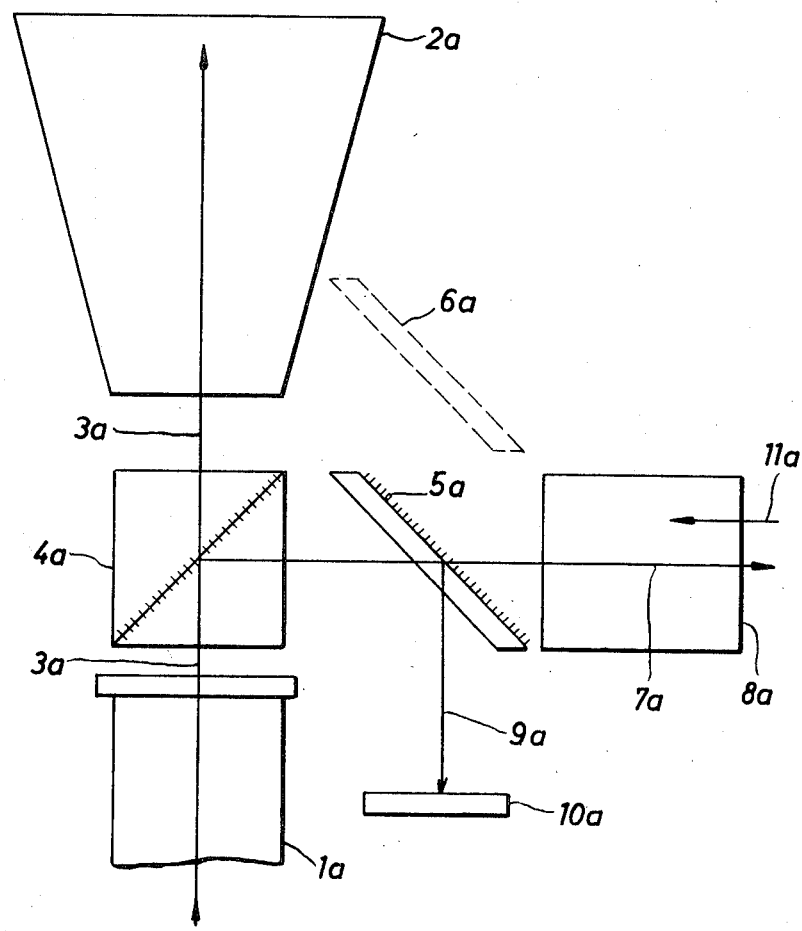
FIG. 2 is a view similar to FIG. 1 and showing a modification of the photomicroscope.

The photomicroscope of FIG. 2 is similar in principle to the photomicroscope of FIG. 1. The same components are indicated by adding the letter a to corresponding reference numerals.

Contrary to FIG. 1, fully silvered mirror 5a is disposed at an angle preferably a 45° angle, with reference to beam 7a. Accordingly, beam 9a is not reflected through beam splitter 4a but deflected at a right angle toward means 10a. In other words, according to FIG. 2 optical means 10a is not disposed in optical alignment with mirror 5a and beam splitter 4a but at an angle to the mirror. Mirror 5a can be lifted into and out of its normal position in which it intersects beam 7a into the position 6a by a lifting mechanism as diagrammatically indicated in FIG. 1.

Figure 3:
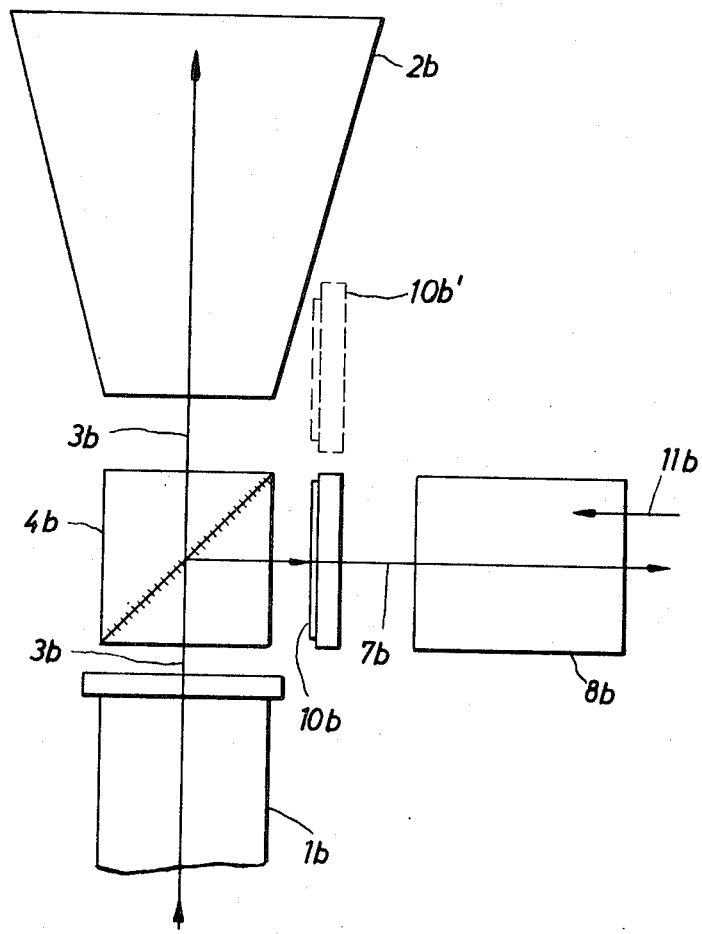
FIG. 3 is also a view similar to FIG. 1 and showing another modification of the photomicroscope.

According to FIG. 3, the fully silvered mirror is omitted and light beam 7b impinges directly upon light-sensitive optical means 10b. This means can be lifted out of its position intercepting light beam 7b into the position 10b' by a lifting mechanism of the kind shown in FIG. 1 for mirror 5.

As is shown beam 7 passes the body of the beam splitter only once as is also the case in FIG. 2 while according to FIG. 1, the light beam deflected by the beam splitter passes the body of the beam splitter twice.

What is claimed is:

1. A photomicroscope comprising in combination:
    a photographic camera;
    a microscope disposed in optical alignment with the camera,
    an ocular for viewing an object placed on a stage of the microscope, said ocular being disposed outside the path of the light beam from the microscope to the camera;
    a light meter;
    a beam splitter stationarily interposed in said light path, said beam splitter passing part of the light beam to the camera and deflecting another part toward the ocular; and
    a movably mounted fully silvered mirror interposed in the path of the light beam from the beam splitter toward the ocular, said mirror being selectively movable between an inactive position withdrawn from said light path and an active position intersecting said light path and directing said light beam upon the light meter.
2. A photomicroscope comprising in combination:
    a photographic camera;
    a microscope disposed in optical alignment with the camera;
    an ocular for viewing an object placed on a stage of the microscope, said ocular being disposed outside the path of the light beam from the microscope to the camera;
    a beam splitter stationarily interposed in said light path, said beam splitter passing part of the light beam to the camera and deflecting another part toward the ocular; and
    a movably mounted light meter interposed in the path of the light beam from the beam splitter toward the ocular, said light meter being selectively movable between an inactive position withdrawn from said light path and active position intersecting said light path for directing said light beam upon the light meter.
3. A photomicroscope according to claim 1 wherein said mirror in its beam intersecting position is disposed normal to the light path of the beam part directed toward the ocular and optically interposed between one side of the beam splitter and the ocular, the light meter being disposed on the side of the beam splitter opposite to said one side and in optical alignment with the beam splitter and the mirror when the latter is in its active position.
4. A photomicroscope according to claim 1 wherein said mirror is disposed at an angle with reference to the light path between the beam splitter and the ocular is disposed in the path of the light deflected by the mirror.
5. The photomicroscope according to claim 4 wherein said mirror is disposed at a 45° angle thereby causing a 90° deflection of the light incident upon the mirror.
6. The photomicroscope according to claim 1 wherein a directional force means biases the mirror into its light beam intersecting position.
7. The photomicroscope according to claim 6 wherein said mirror in its the light path intersecting position occludes the exit face of the ocular.
8. The photomicroscope according to claim 1 wherein said beam splitter is in the form of a cubic prism divided by a partly silvered diagonal wall.
9. The photomicroscope according to claim 1 wherein said light meter comprises a photoresistor.

* * * * *